Figure 1:
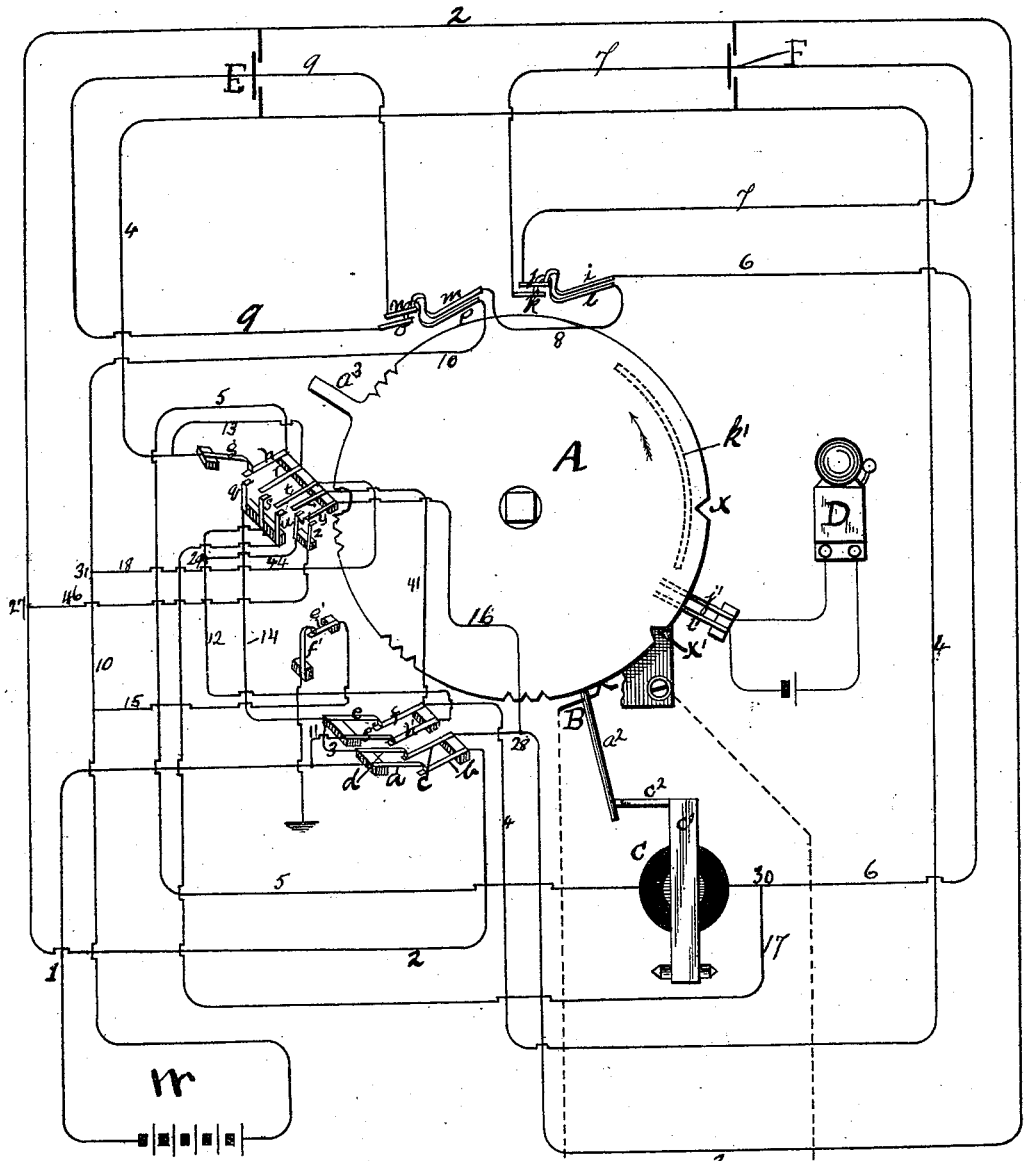

(No Model.) 3 Sheets—Sheet 1.
J. W. FROST.
AUTOMATIC FIRE ALARM.

No. 563,474. Patented July 7, 1896.

WITNESSES:
Wm A Rosenbaum
G. H. Stockbridge

INVENTOR
Joseph W. Frost
BY
ATTORNEY

THE NORRIS PETERS CO., PHOTO-LITHO., WASHINGTON, D. C.

(No Model.) 3 Sheets—Sheet 2.
J. W. FROST.
AUTOMATIC FIRE ALARM.
No. 563,474. Patented July 7, 1896.
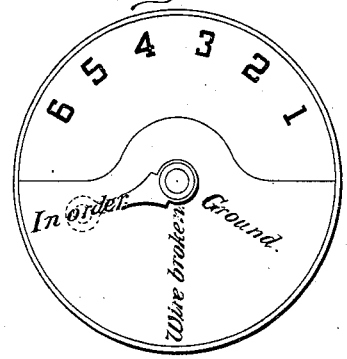
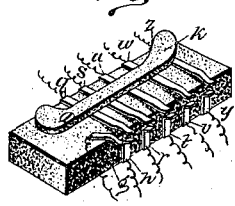
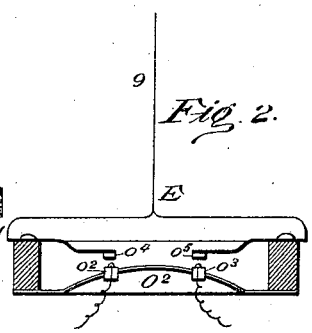
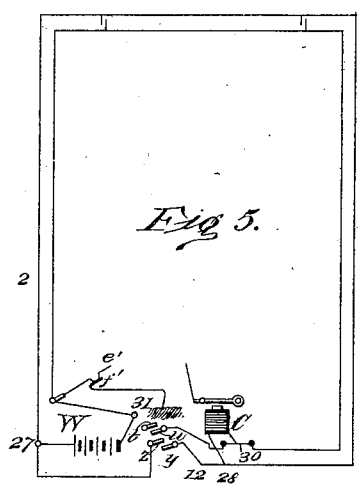
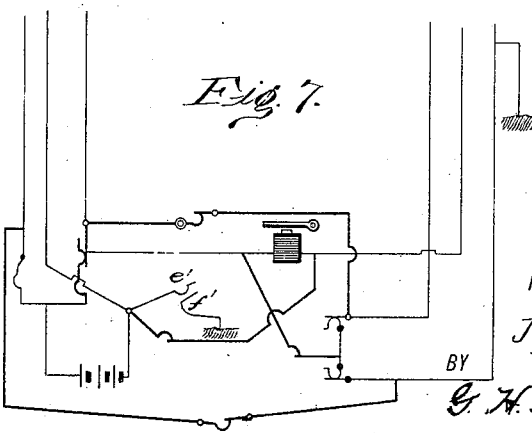
WITNESSES:
Thos. L. Gatchel.
C. L. Belcher
INVENTOR
J. W. Frost,
BY
G. H. Stockbridge
HIS ATTORNEY.

(No Model.)  3 Sheets—Sheet 3.

J. W. FROST.
AUTOMATIC FIRE ALARM.

No. 563,474.  Patented July 7, 1896.

Witnesses
Edwin L. Bradford
Wm. M. Stockbridge

Inventor
J. W. Frost
By his Attorney
G. H. Stockbridge.

THE NORRIS PETERS CO., PHOTO-LITHO., WASHINGTON, D. C.

UNITED STATES PATENT OFFICE.

JOSEPH W. FROST, OF NEW YORK, N. Y.

AUTOMATIC FIRE-ALARM.

SPECIFICATION forming part of Letters Patent No. 563,474, dated July 7, 1896.

Application filed February 18, 1888. Serial No. 264,512. (No model.)

*To all whom it may concern:*

Be it known that I, JOSEPH W. FROST, a citizen of the United States, residing in the city and county of New York, State of New York, have invented certain new and useful Improvements in Automatic Fire-Alarm-Telegraph Systems; and I do hereby declare that the following is a full, clear, and exact description of my invention, such as will enable others skilled in the art to which it appertains to make and use the same.

My invention relates to improvements in automatic fire-alarm-telegraph systems in which I combine the advantage of a closed-circuit with those of an open-circuit system. It is well understood that a closed-circuit system of fire-telegraphs possesses the advantage of being easily adapted to give an indication when the line breaks. It is also understood that the use of closed thermostats is open to the objection that if one of them is actuated by a fire when the line is broken it fails to operate the circuit, and is therefore practically inoperative. I employ, in connection with a closed-circuit system, open-circuit thermostats which are operative in any condition of the line. I prefer to use my double thermostat, as set forth in application, Serial No. 252,150, renewed by me October 12, 1887, in which the circuit is normally open at two points, but the use of such a thermostat is not essential in order to secure many of the advantages of my system.

I am aware that broadly it is not new to employ open-circuit branches on closed circuits, but by my special combination of the two I secure improved results.

My invention is especially designed for use in connection with local or building circuits which are connected with a main village or city circuit in such a manner that the operation of the local circuit will sound an alarm at a central station. Heretofore difficulty has been experienced in adapting such circuits to give an indication when any of the local wires are broken or when an accidental grounding of the circuit takes place. My present invention provides for meeting both these contingencies, and also for indicating when a fire takes place and in what section of the building the fire has started.

In adapting my invention to use in connection with my double thermostat, I have also provided means for giving a distinctive signal when only one side of a thermostat is closed. This will prevent a fire-signal being sent in when a closure of one side of a thermostat has taken place through the jarring of the building or from any other accidental cause. In case a single thermostat is used in distinction from a double thermostat, although the danger of the terminals being jarred into contact would exist, yet so far as all the other advantages of my system are concerned they would apply to an organization in which single thermostats were used as well as to the one which is described as preferred. In other words, my invention is applicable, broadly, to a system in which any kind of thermostat is used, although I prefer to employ my own double thermostat.

My invention is illustrated in the accompanying drawings, in which—

Figure 9:
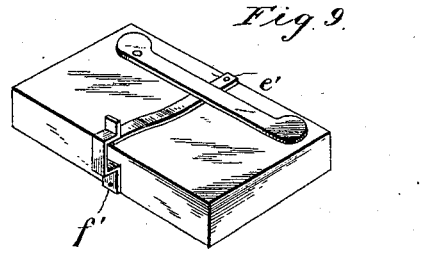
Figure 10:
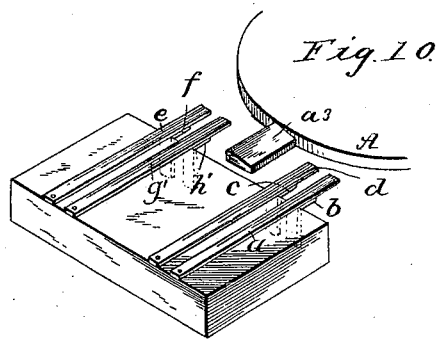
Figure 11:
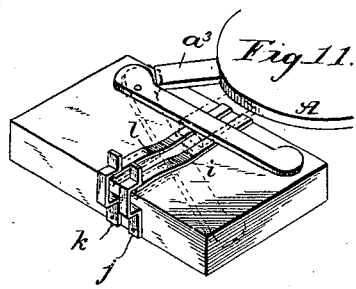

Figure 1 is a diagram of the circuits and apparatus at a building to be protected by my system. Fig. 2 is a detail of my double thermostat. Fig. 3 shows my switch devices. Fig. 4 is an elevation of my annunciator. Figs. 5, 6, and 7 are diagrams showing typical circuits without reference to the apparatus. Fig. 8 shows a detail of insulated conducting-rim on the under side of the circuit-breaking wheel. Figs. 9, 10, and 11 are detail views of the second, third, and fourth set of switches, respectively.

A is a circuit-breaking wheel, and B a spring-contact, these two parts being of the well-known type and forming the terminals of a signaling-circuit, including a central office and a battery and signaling apparatus located at such office. These form no part of my present invention, and their arrangement may be varied to suit different conditions or wishes. The wheel is adapted to rotate in the direction of the arrow under the influence of any suitable motor, and in so rotating breaks the signaling-circuit at the notches, so as to send a definite signal to the central office. In the present instance the wheel is notched to represent the signal "3" repeated four times. It is also provided with two single notches $x\ x'$, to represent different sections or floors of a building in which the signaling apparatus is located. It will be understood that if the signal "3" is sent only once it will indicate to attendants at the central office a certain understood condition of the system, while a repetition or a second or third repetition will each indicate a distinct condition. Any other devices for sending distinctive signals will, of course, be equivalent to the repetition of the number signaling devices.

W is my local battery, the circuit of which is normally closed over the following course: wire 1, springs $a\ b$, wire 2, springs $c\ d$, wire 3, springs $e\ f$, wire 4, springs $g\ h$, wire 5, magnet C, wire 6, springs $i\ j$, wire 7, springs $k\ l$, wire 8, springs $m\ n$, wire 9, springs $o\ p$, and wire 10 to battery. Accordingly, the circuit of magnet C is normally closed, and when closed keeps the signaling mechanism from rotation through its armature $c'$ and an arm $c^2$, attached thereto, acting upon a fan or escapement $a^2$ of the motor which drives the mechanism. The mechanism is released when the circuit of magnet C is broken or when the magnets are short-circuited.

Of the wires above mentioned 2, 4, 7, and 9 form the circuit-wires which extend through the building to be protected. 7 and 9 form what I call the "section" or "story" wires. The most of the other wires are short wires forming connections inside the box that contains my signaling mechanism.

Upon the wheel A is fixed a conducting-arm $a^3$. The springs already mentioned are arranged in the path of this arm in such a manner as to be operated thereby in a way that will be explained hereinafter. Besides the springs mentioned there are other springs similarly located, as follows: $q\ r\ s\ t\ u\ v\ w\ y\ z$ $e'\ f'$ and $g'\ h'$. Moreover, there are two springs $i'\ j'$, which are located beneath the wheel in such a position as to be connected or joined by an insulated conducting rim or segment $k'$, secured to the under side of the wheel, such connection taking place at or about the time when the fourth signal is being sent in. These two last springs are connected with the circuit of a bell D, so that the bell is operated when the two springs are joined by the segment $k'$. The different groups of springs, acting in combination with the arm $a^3$, form sets of switches, which I shall designate as the "first set," "second set," "third set," and so on, beginning with the first group, which is operated by arm $a^3$ after the mechanism begins to rotate.

It has been stated already that the signaling mechanism will be released whenever the magnet C is deënergized, as by the breaking of its circuit. Let it be supposed, now, that one of the wires of the circuit already traced becomes accidentally broken, say the wire 2. Obviously, the magnet C will be deënergized, its armature be released, and the mechanism will begin to rotate in the direction of the arrow. This will cause the spring B to pass over the first set of notches in the wheel A and will send the signal "3" to the central office.

Before the second signal is sent, however, the arm $a^3$ will have come into a position to operate the first set of contact-springs, the relation of which will be changed by breaking connection between $g$ and $h$, and making contact between the other springs in pairs, as follows: $h\ q$, $r\ s$, $t\ u$, $v\ w$, and $y\ z$. The operation of these springs by the arm $a^3$ is shown in detail in Fig. 3, where it will be seen that the contact having once been made between the springs $h\ q$, $r\ s$, $t\ u$, $v\ w$, and $y\ z$ by means of the lever K, it remains until the wheel A, carrying the arm $a^3$, has been forced back into its normal position, in doing which the arm $a^3$ bears against the other end of the lever K and forces it into its normal position, thereby breaking the contact. This action will restore the circuit through magnet C by the three following courses: first, wire 1, spring $a$, wire 11, springs $g'\ h'$, wire 12, springs $s\ r$, wires 13 and 4, springs $f\ e$, wire 14, springs $q\ h$, wire 5, and thence over the original course or by wire 17, springs $u\ t$, and wires 18 and 10; second, wire 1, springs $a\ b$, wire 2 to 27, wire 46, springs $z\ y$, wire 16 to 28, wire 2, springs $c\ d$, and so on; third, wire 1, spring $a$, wire 11, springs $g'\ h'$, wire 12 to 29, wire 44, springs $w\ v$, wire 41 to springs $f\ e$, and so on. The restoration of the circuit through magnet C causes the attraction of its armature and stops the rotation of the mechanism, not, however, until one signal has been sent in. Accordingly, if only one signal is received at the central office, it will indicate that one of the wires has been broken. A similar result would take place if the break occurred in any other wire of the original circuit besides 2, say, for example, wire 4. In that case the circuit of the battery would be as above stated, except that course one would be cut out and replaced by the following course: wire 1, springs $a\ b$, wire 2, springs $c\ d$, wire 3, spring $e$, wire 14, springs $q\ h$, and thence as before. In effect, the action of the arm $a^3$ cuts out or short-circuits the break, and restores the magnet-circuit around the break.

In case both wires 2 and 4 should break, there would be two courses for a current from the battery W through the magnet C, as follows: The first course would lead by wire 1, springs $a\ b$, wire 2 to 27, and wire 46 to springs $z\ y$, wire 16 to 28, wire 2, springs $c\ d$, wire 3, spring $e$, wire 14, springs $q\ h$, wire 5, through magnet C, and thence over the first course described. The second course leads from wire 1, spring $a$, wire 11, springs $g'\ h'$, wire 12 to 29, wire 44, springs $w\ v$, wire 41 to springs $f\ e$, and thence by the course last described. The connections made through the springs $v$ and $w$ and $y$ and $z$ provide for the restoration of the circuit as above described when both wires are broken.

If either of the section-wires 7 or 9 is broken, the circuit is restored, through contact between the springs $t$ and $u$, over any of the following courses: first, wire 1, springs $a\ b$, wire 2, springs $c$ $d$, wire 3, spring $e$, wire 14, springs $q$ $h$, wire 5, magnet C, wire 17, springs $u$ $t$, and wires 18 and 10; second, wire 1, springs $a$ $b$, wire 2 to 27, wire 46, springs $z$ $y$, wire 16 to 28, thence by wire 2 to springs $c$ $d$, and so on; third, wire 1, spring $a$, wire 11, springs $g'$ $h'$, wire 12, springs $s$ $r$, wire 13 and 4, springs $f$ and $e$, wire 14, and so on; fourth, wire 1, spring $a$, wire 11, springs $g'$ and $h'$, wire 12 to 29, wire 44, springs $w$ and $v$, wire 41 to springs $f$ $e$, and so on.

If all the wires 2, 4, 7, and 9 are broken at once, the course after restoration will be over the course numbered "second" in the preceding paragraph. In any condition of the wires the circuit will be restored by the operation of the first switch, and the system will be put in condition to be operated by the closing of one or both sides of my thermostat, as will be described hereinafter, the operation of the third switch always determining whether the closure has taken place on one or both sides of my thermostat.

A second contingency which might arise is an accidental grounding of the circuit. It will be noticed that I run from wire 10, which is connected with one pole of the battery, a wire 15 to the spring $e'$, which is normally in contact with $f'$, the latter being connected to ground. Now a grounding of the circuit on the other side of the battery, as by the connection of wire 2 or wire 4 with the ground in any manner, will of course cut out the magnet C and release the mechanism. In order to restore the circuit, however, it is only necessary to break the normal ground at $e'$ $f'$, when the magnet will be energized. This I accomplish by means of the arm $a^3$ acting upon the second set of switches after the second signal has been sent in.

A third contingency calculated to disturb the working of my system might arise in case one side only of my thermostats E F should be closed. These thermostats are arranged, as will be observed, between wires 2, 4, and 9 and 2, 4, and 7. They may in practice be placed in any suitable part of a building which is to be protected in such a position that they will be exposed to the effects of fires in different parts of the building.

Suppose now that the thermostat E is closed between wires 2 and 9, but remains open between wires 9 and 4. In this case a short circuit around the magnet C will be made over the following course: wire 1, springs $a$ and $b$, wire 2, one side of thermostat E, wire 9, springs $o$ and $p$, and wire 10. The magnet C is thus cut out and releases the signaling mechanism, which immediately begins to move. As the starting of the mechanism results from the short circuit, such as has been described, and not from a break or a grounding of the circuit, the changing of the switches of the first set by the arm $a^3$ will not restore the circuit, nor will the breaking of the ground at the second set of switches. Accordingly the local signal will be sent three times to the central office. That is to say, in order to send a distinctive signal for this particular condition of the circuit, I provide that the mechanism shall not be stopped until after the third signal has been transmitted. Meanwhile the arm $a^3$ in acting upon the first two sets of signals, that is, in passing to the position which it occupies when three signals have been sent in, puts the circuit in such a condition that its action upon the third set of switches shall stop the mechanism by restoring the circuit, provided the cause which has set the mechanism in motion is a half-closure of a thermostat, as has been described above. On coming to the third set of switches the arm $a^3$ operates them by first lifting simultaneously the springs $e$ and $g'$ from the springs $f$ and $h'$, then restoring these springs and lifting simultaneously the springs $d$ and $a$, respectively, from the springs $c$ and $b$. From the above it will appear that the third set of switches is of a somewhat different construction from the others. This set is shown in detail in Fig. 10. The springs $e$, $g'$, $d$, and $a$ are normally in contact with the springs $f$, $h'$, $c$, and $b$, respectively, and when the contact has been broken by the arm $a^3$ lifting the springs $e$, $g'$, $d$, and $a$ it remains so only so long as the arm $a^3$ is under them, the said springs resuming their normal position when the arm $a^3$ has passed by. In the present instance the lifting of the first two springs will have no effect, while the lifting of the second pair will restore the circuit through magnet C and stop the mechanism, the circuit being as follows: wire 1, spring $a$, wire 11, springs $g'$ and $h'$, wire 12, springs $s$ and $r$, wires 13 and 4, springs $f$ and $e$, wire 14, springs $q$ and $h$, wire 5, magnet C, and so on, the remainder of the circuit being similar to that first described. If the half-closure should take place between 9 and 4, instead of 9 and 2, the lifting of the first pair of springs, to wit: $e$ and $g'$, would have restored the circuit in a similar manner.

The above description details the operation of my apparatus under the various conditions resulting from accident, the action being entirely automatic and requiring no manual or periodical testing of the system. Without some provision of this kind accidents might easily pass unobserved, and the system might be found wholly inoperative when called upon to do actual service in announcing a conflagration. The provisions which I have made guard fully against the danger of such accidents as will disturb the working of my system, so that it becomes a matter of almost absolute certainty that when a fire does take place and the apparatus is needed for important service it will be found in good condition. Under such circumstances one or the other of the thermostats will be closed on both sides, cutting out the magnet C and releasing the mechanism, which will be started and continue to turn until the arm $a^3$ comes into contact with one or the other of the fourth and fifth sets of switches. Suppose a fire breaks out in that part of the building where the thermostat F is located. This thermostat on being closed will cut out the magnet and the signaling mechanism will be released. When the arm $a^3$ reaches the fourth set of springs, it first makes electrical connection between $l$ and $i$ and then breaks the connection between these springs and the springs $k$ and $j$, as clearly shown in detail in Fig. 11. When this happens, the circuit is restored through the magnet C, for the reason that the short circuit around the same is ruptured at the switch. The arm $a^3$, being a conducting-arm, closes the circuit from $i$ to $l$, and this furnishes a complete course for the current through the magnet C. The short circuit which is formed by the closure of the thermostat is similar to that described in connection with the supposition that thermostat E had made connection between wires 2 and 9. In the present instance wires 2 and 7 are connected and the short circuit goes from 7 to springs $k$ and $l$ and from there over the course already described. By the breaking of the connection at the switch $i, l, j$, and $k$ and the making of a connection between $i$ and $l$ substantially the original circuit is restored. The course from 2 to 4, however, is directly through the thermostat F and the connection between $i$ and $l$ is directly through the arm $a^3$.

It is evident that if the thermostat E should be closed instead of F the mechanism would travel far enough to operate the fifth set of switches, the action being exactly similar to that just described. Thus a distinctive signal is given for each accidental derangement of the system, and also in case of the occurrence of a fire. In the latter case the story or section in which the fire starts is also indicated. I provide an annunciator, as shown in Fig. 4, so as to provide means, not only for sending in an audible signal to the central station, but also for indicating at the local station that a disturbance has taken place, and what is the cause of it. The annunciator consists, essentially, of an annunciator-plate in front of the signal-wheel, the said plate being marked with numbers to indicate sections or stories and with such phrases as "wire broken," "ground," &c. A hand or pointer is carried on the shaft of the signal-wheel in front of the annunciator-plate. The numbers and characters are so arranged that when the wheel is stopped after the first signal the hand will point to "wire broken," and when the wheel is stopped after the second signal the hand will point to "ground," and so on.

On back of the signal-wheel is an insulated conducting ring or segment $k'$. This is so located as to make connection between the springs $i'$ and $j'$ at or about the time when the arm $a^3$ makes connection between springs $i$ and $l$. By these means the circuit of the bell is closed and an audible signal is given at the local station, indicating that a fire has taken place. At about the same time also, or a little before, the spring B passes over the notch $x'$. If but a single notch is passed, it will indicate at the central station that the fire is in the first story or section of the building; and if the second notch is passed, it will indicate a fire in the second section or story, and so on. In either case the local bell will be rung and the central office will be notified at the same time.

In Fig. 5 I show a typical circuit illustrating the system without regard to apparatus. This figure shows the circuits in their normal condition and simplified by the removal of the section-wires. The circuit here represented is adapted for use with a single or two point thermostat. Now in case one of the circuit-wires breaks the magnet will release the mechanism already described, and by doing so will close the shorter circuit through the switches or swings $t$ and $u$ and $z$ and $y$, which are operated simultaneously, short-circuiting the local circuit and restoring the magnet-circuit. This will leave the circuit in condition to be operated by the closure of a thermostat.

The original circuit as I have shown it in connection with my apparatus is more clearly shown, typically, in Fig. 6, by the lighter lines. In the normal arrangement there is no break between $g$ and $h$, but the break between those points occurs on the first movement of the signaling-wheel. The figure shows in heavy lines the connections that are made by the first set of switches being operated. A break occurs between $g$ and $h$ and contact is made between $h$ and $q$, $r$ and $s$, $t$ and $u$, $v$ and $w$, and $y$ and $z$. The changes caused by these alterations in the condition of the circuit have been detailed already. The section-wires 7 and 9 are run in the form of loops and are connected up in series by the switches formed by the springs $i\ j$, $k\ l$, $m\ n$, $o\ p$. In like manner, the main wires 2 and 4 are formed into loops with normally open cross connections through suitable switches, which switches, on being operated, close the said cross connections. Thus, the switch formed by the springs $y\ z$, when closed, forms the wire 2 into a closed loop, the object being to provide two paths for the current in case the thermostat is operated in a broken condition of the line. In the same way, and with the same object, the closing of the switch formed by the spring $v\ w$ puts the wire 4 in the form of a closed loop.

Fig. 7 shows the change made at the second switch by the lifting of $e'$ from $f'$.

The means for operating all the switches $a\ b\ c\ d$, $i\ j\ k\ l$, and $e'\ f'$, in connection with the arm $a^3$, are similar to those shown in detail in Fig. 9.

The circuits employed in the system hereinbefore described might be utilized in a burglar-alarm system as well.

Fig. 2 shows one of my double thermostats in detail. O² is an expansible disk carrying two insulated contacts o² o³, which coöperate with two corresponding contact-springs o⁴ o⁵, which springs are joined to a common circuit-wire, as 9. It is clear that the disk itself might be one terminal of a circuit and that the two springs o⁴ o⁵ might be the coöperating terminals. The only thing necessary to constitute my thermostat a "double" thermostat, as is fully set forth in my application, Serial No. 252,150, above referred to, is that there should be three or more contact parts in groups of two, one or more of which should be an expansible element.

The coöperating contacts should both, or all, be on the same thermal side of the expansible disk, or other thermal element or elements, in the sense that a movement of the said disk, or the operation of the said thermal element or elements in one thermal direction, will close or open the contacts. In other words the action of a continuous increase or a continuous decrease of the temperature will bring about a closure or rupture of the circuit at two or more points. In the case, say, of a disk, it is conceivable that this might be accomplished by employing contact-points on opposite sides, mechanically, of the disks, but, if the movement of the disk in one direction will operate all the contacts, then the latter may be regarded as on the same thermal side of the disk, and the whole structure will be equivalent to that shown by me.

Other modifications might suggest themselves to other inventors without any substantial departure from the principle of my invention.

For the purposes of a distinctive-alarm system in which the primary controlling element is a thermostat of the character described in the foregoing specification, the signaling mechanism intermediate between the thermostats and the alarm apparatus may be disregarded, and, in certain of the claims which follow, such intermediate mechanism is left out of the account.

Having now described my invention, what I claim is—

1. In an electrical alarm system, the combination with a signaling mechanism, and an electromagnet normally controlling the same, of a closed circuit through the said magnet, the said closed circuit being looped between the magnet and the battery on each side, cross connections, normally open, connecting opposite sides of each loop, and mechanically-operated switches adapted to close said cross connections, as set forth.

2. In an electrical alarm system, a closed electric circuit including a translating device, such as an electromagnet and including a series of loops located between the said magnet and the battery which supplies the circuit, normally-closed connections between successive loops, cross connections, normally open, connecting opposite sides of each loop, and devices for opening said closed connections and closing said open connections, as set forth.

3. In an electrical alarm system, a closed electric circuit including a translating device, such as an electromagnet and including a series of loops located between the said magnet and the battery which supplies the circuit, normally-closed connections, between successive loops, cross connections, normally open, connecting opposite sides of each loop, and automatic devices for opening said closed connections and closing said open connections, as set forth.

4. The combination with an electromagnet of a closed circuit through the said magnet, the said closed circuit including one or more loops located between the said magnet and the battery which supplies the circuit, cross connections normally open connecting opposite sides of each loop, and mechanically-operated switches for closing the said cross connections simultaneously or substantially so, as set forth.

5. In an electrical alarm system, the combination with a signaling mechanism and an electromagnet normally controlling the same, of a closed circuit, the said closed circuit including a series of loops with cross connections between successive loops, normally closed, and cross connections, normally open, connecting opposite sides of each loop, and devices operated simultaneously with said signaling mechanism, when actuated, for opening the said closed connections and closing said open connections, as set forth.

6. In an electrical alarm system, a signaling mechanism provided with distinctive signaling devices, an electromagnetic controlling device therefor, circuit-controllers governing the said electromagnetic controlling device, the said circuit-controllers being each provided with three or more contact parts in groups of two, all in combination with circuits and connections, substantially such as described, whereby on the operation of either or both groups of contact parts, definite signals will be transmitted, as set forth.

7. In an electrical alarm system, a signaling mechanism provided with distinctive signaling devices, an electromagnetic controlling device therefor, thermostats governing the said electromagnetic controlling device, each thermostat being provided with three or more contact parts in groups of two, all in combination with circuit and connections, substantially such as described, whereby on the operation of either, or both groups of contact parts, definite signals will be transmitted, as set forth.

8. In an electric alarm system, the combination with the signaling mechanism and an electromagnet normally controlling the same, of a closed local or building circuit through the said magnet, and a switch operated by the said signaling mechanism, when actuated, the switch-terminals being connected with the local circuit, one on each side of the magnet, whereby a break in the said circuit will be short-circuited and the circuit restored through the magnet as and for the purposes set forth.

9. In an electrical alarm system, the combination with a signaling mechanism, an electromagnet normally controlling the same, of a closed circuit through the said magnet, and a switch operated by the said signaling mechanism, when actuated, the switch-terminals being connected with the closed circuit, one on each side of the magnet, as and for the purposes set forth.

10. In an electrical alarm system, the combination with a circuit-controlling mechanism, provided with distinctive signaling devices, and an electromagnet normally controlling the same, of a closed circuit through the said magnet, and a switch operated by the said signaling mechanism, before the sending of the second signal, the switch-terminals being connected with a closed circuit one on each side of the magnet, whereby on a break in the local circuit a signal will be sent, and the said break will be short-circuited and the circuit restored through the magnet, as and for the purposes set forth.

11. In an electrical alarm system, the combination with a circuit-controlling mechanism provided with distinctive signaling devices, and an electromagnet normally controlling the same, of a closed local or building circuit through the said magnet, and a switch operated by the said signaling mechanism, before the sending of the second signal, the switch-terminals being connected with the local circuit, one on each side of the magnet, as and for the purposes set forth.

12. In an electrical alarm system, a signaling mechanism provided with distinctive signaling devices, and an electromagnet normally controlling the same, of a closed circuit through the said magnet, and a switch operated by the said signaling mechanism before the sending of the second signal, the switch-terminals being connected with a closed circuit, one on each side of the magnet, all in combination with a dial in front of the signaling mechanism and a pointer connected with the said mechanism, traversing the face of the dial.

13. In an electrical alarm system, a main circuit and a signaling mechanism located therein and provided with distinctive signaling devices, an electromagnet for controlling the said signaling mechanism, and a closed local or building circuit through the said magnet, in combination with an artificial ground on one side of the local battery, and a switch in said ground and a mechanical device operated by the signaling mechanism, when actuated, for breaking the local ground, the said switch being located in the line of motion of the said mechanical device, and the relations being such that the mechanical device operates the switch, only after a predetermined number of signals has been sent by the signaling mechanism, whereby if a foreign ground has short-circuited the controlling-magnet, the ground-circuit will be automatically broken and the circuit restored through the said magnet, but only after a distinctive signal has been sent in, substantially as set forth.

14. In an electrical alarm system, a signaling mechanism in the main circuit, an electromagnet for controling the same, and a closed local or building circuit through the said magnet, the said local circuit being branched beyond the said magnet and extending through the building to be protected in branches, located in proximity to section-wires, as described, the section and branches being on opposite sides of the magnet, all in combination with open double-circuit controllers, such as thermostats extending between the branch and section wires, a device operated by the signaling mechanism, when actuated, for simultaneously lifting the ends of one of the branched wires, and afterward those of the other, as and for the purposes set forth.

15. In an electrical alarm system, a signaling mechanism, and electromagnet for controlling the same, and a closed building-circuit through the said magnet, the said building-circuit being branched beyond the said magnet and extending throughout the building to be protected, located in proximity to section-wires, as described, the section-wires and branch being on opposite sides of the magnet, all in combination with open double-circuit controllers, such as thermostats, extending between the branch and section wires, a device operated by the signaling mechanism, when actuated for simultaneously lifting the ends of one of the branched wires, and then those of the other, as and for the purposes set forth.

16. In an electrical alarm system a signaling mechanism in the main circuit, an electromagnet normally controlling the same and a closed local or building circuit through the said magnet, in combination with open-circuit controllers, such as thermostats located in multiple arc in a short circuit around the magnet, and a mechanical device operated by the said signaling mechanism, when actuated, in disconnecting the wires from the short circuit, the terminals of the short circuit being located in the path of movement of the said mechanical device.

17. In an electrical alarm system, a signaling mechanism provided with distinctive signaling devices, and electromagnet normally controlling the same, and a closed circuit through the said magnet, in combination with open-circuit controllers, such as thermostats, located in multiple arc in short circuit around the magnet, a mechanical device operated by said signaling mechanism, when actuated, for disconnecting the wires from the short circuit, the terminals of the short circuit being located in the path of movement of the said mechanical device, and the relations being such that the said mechanical device and the said terminals for disconnecting the short-circuit wires only after a predetermined number of signals has been sent.

18. In an electrical alarm system, a signaling mechanism in the main circuit, an electromagnet normally controlling the same and a closed local or building circuit through the said magnet in combination with open-circuit controllers, such as thermostats, located in the multiple arc in the short circuit around the magnet, a mechanical device operated by the said signaling mechanism, when actuated, for disconnecting the wires from the short circuit, the terminals of the short circuit being located in the path of movement of the said mechanical device, all in combination with a dial in front of the signaling mechanism, and a pointer connecting the said mechanism and traversing the face of the dial.

19. In an electrical alarm system a signaling mechanism, an electromagnet normally controlling the same and a closed circuit through the said magnet, in combination with open-circuit controllers, such as thermostats, located in multiple arc in the short circuit around the magnet, a mechanical device operated by the said signaling mechanism, when actuated, for disconnecting the wires from the short circuit, the terminals of the short circuit being located in the path of movement of the said mechanical device, all in combination with a dial in front of the signaling mechanism and a pointer connected with the said mechanism and traversing the face of the dial.

20. In an electrical alarm system, a signaling mechanism in the main circuit, an electromagnet normally controlling the same, and a closed local or building circuit through the said magnet, open connections from opposite sides of the magnet to opposite battery-poles in combination with mechanical device operated by the said signaling mechanism when actuated for closing the said open connections, the terminals of the said open connections being located in the path of movement of the said mechanical device as and for the purposes set forth.

21. In an electrical alarm system a signaling mechanism, an electromagnet normally controlling the same, a closed circuit through the said magnet, the open connections from opposite sides of the magnet to opposite battery-poles, in combination with mechanical device operated by the said signaling mechanism, when actuated, for closing the said open connections, the terminals of the said connections being located in the path of the said mechanical device, as and for the purposes set forth.

In witness whereof I have hereunto affixed my seal and signed my name in the presence of two subscribing witnesses.

JOSEPH W. FROST.

Witnesses:
AUGUSTUS MERRITT,
G. H. STOCKBRIDGE.